United States Patent [19]

Davis et al.

[11] Patent Number: 4,745,267
[45] Date of Patent: May 17, 1988

[54] FRAUDULENT CARD INTERCEPT SYSTEM

[75] Inventors: William H. Davis, Fairview Park, Ohio; John J. Goba, Elizabeth, N.J.; Dean D. Riggs, Avon Lake, Ohio; Abraham Zeewy, Cleveland; Howard M. Flint, Chagrin Falls, both of Ohio

[73] Assignee: Fairview Partners, Westlake, Ohio

[21] Appl. No.: 772,335

[22] PCT Filed: Dec. 26, 1984

[86] PCT No.: PCT/US84/02129
§ 371 Date: Aug. 23, 1986
§ 102(e) Date: Aug. 23, 1985

[87] PCT Pub. No.: WO85/02927
PCT Pub. Date: Jul. 4, 1985

Related U.S. Application Data

[63] Continuation-in-part of Ser. No. 566,180, Dec. 28, 1983, Pat. No. 4,626,669.

[51] Int. Cl.⁴ .............................................. G06F 15/30
[52] U.S. Cl. ...................................... 235/379; 380/24; 235/380
[58] Field of Search .................... 235/379, 380, 381; 340/825.33, 825.31; 380/23, 24, 25

[56] References Cited

U.S. PATENT DOCUMENTS

| | | | |
|---|---|---|---|
| T. 921,007 | 4/1974 | Foley . | |
| 3,013,206 | 12/1961 | Youngquist et al. . | |
| 3,612,835 | 10/1971 | Andrews | 235/61.11 |
| 3,636,318 | 1/1972 | Lindstrom et al. | 235/61.12 |
| 3,657,521 | 4/1972 | Constable | 235/61.7 B |
| 3,755,730 | 8/1973 | Vogelgesang | 324/34 |
| 3,878,367 | 4/1975 | Fayling et al. | 235/61.12 |
| 3,886,327 | 5/1975 | Dobosi | 235/61.7 |
| 3,890,599 | 6/1975 | Simjian | 340/149 |
| 3,914,789 | 10/1975 | Coker et al. | 360/235 |
| 3,919,447 | 11/1975 | Kilmer et al. | 428/138 |
| 3,919,719 | 11/1975 | Wright et al. | 360/134 |
| 3,921,969 | 11/1975 | Hickey et al. | 271/235 |
| 3,922,430 | 11/1975 | Mayer | 428/325 |
| 3,938,091 | 2/1976 | Atalla . | |
| 3,985,998 | 10/1976 | Crafton | 235/380 |
| 4,013,894 | 3/1977 | Foote et al. | 250/569 |
| 4,101,905 | 7/1978 | Hale et al. | 346/74.1 |
| 4,107,653 | 8/1978 | Kruklitis | 340/146.3 |
| 4,138,057 | 2/1979 | Atalla . | |
| 4,138,058 | 2/1979 | Atalla . | |
| 4,140,272 | 2/1979 | Atalla . | |
| 4,171,864 | 10/1979 | Jung et al. | 350/3.61 |
| 4,198,619 | 4/1980 | Atalla . | |
| 4,199,100 | 4/1980 | Wostl et al. | 235/381 |
| 4,253,017 | 2/1981 | Whitehead | 235/449 |
| 4,268,715 | 5/1981 | Atalla . | |
| 4,281,215 | 7/1981 | Atalla . | |
| 4,283,599 | 8/1981 | Atalla . | |
| 4,288,659 | 9/1981 | Atalla . | |
| 4,298,217 | 11/1981 | Moraw et al. | 283/83 |
| 4,304,990 | 12/1981 | Atalla . | |
| 4,315,101 | 2/1982 | Atalla . | |
| 4,328,414 | 5/1982 | Atalla . | |
| 4,357,529 | 11/1982 | Atalla . | |
| 4,455,039 | 6/1984 | Weitzen et al. | 283/83 |
| 4,568,936 | 2/1986 | Goldman | 235/380 X |

FOREIGN PATENT DOCUMENTS

2069203 8/1981 United Kingdom .
2073461 10/1981 United Kingdom .

Primary Examiner—David L. Trafton
Attorney, Agent, or Firm—Fay, Sharpe, Beall, Fagan, Minnich & McKee

[57] ABSTRACT

Credit card blanks are manufactured with a plurality of random, secure codes (24) such as randomly applied infrared readable bits. A card encoding apparatus (B) includes a secure code reader (32) for reading the secure code from one of the blanks. The secure code and account information are operated on by an encoding algorithm (36, 38) to generate a verification code which is electromagnetically recorded (40) or embossed (42) on the card. In conjunction with a credit card transaction, the merchant passes the credit card past an electromagnetic read head (50) and an infrared read head (52) to read the electronically encoded account information, verification code, and secure code. A keyboard (54) enables the merchant to manually enter this data if the electromagnetic recording should be unreadable. The verification apparatus operates on the account information with a verification algorithm (66, 68, 70) to generate an answer corresponding to the verification code. If the answer and verification code match, an authentication code generator (82) generates an authentication code which is displayed on an LCD dot matrix display (56) and handwritten by the merchant on the receipt.

12 Claims, 4 Drawing Sheets

| START CODE | ACCN'T # | EXP. DATE | VISUAL COMPAR. ALGORITHM CODE | VISUAL COMPAR. CODE | ELECTRONIC COMPAR. CODE | CIN | PIN |
|---|---|---|---|---|---|---|---|

FRAUDULENT CARD INTERCEPT SYSTEM

CROSS-REFERENCE TO RELATED APPLICATION

This application is a continuation-in-part of Application Ser. No. 566,180, filed Dec. 28, 1983, now U.S. Pat. No. 4,626,669.

BACKGROUND OF THE INVENTION

The present invention relates to the art of document and financial transaction security. It finds particular application in conjunction with the prevention and detection of counterfeiting and alteration of charge or credit cards. It is to be appreciated that the invention has broader applications including identification cards, banking and money transfer cards, passports, key cards and other documents and structures which are to be monitored and protected against alteration and forgery.

Substantial amounts of goods and monies are stolen each year through fraudulent credit card transactions. the fraudulent credit card transactions are aided not only by the thief who steals credit cards, but also by dishonest merchants, dishonest bank employees with access to credit card account information, counterfeiters, credit card alterers, forgers, and the like.

Various techniques have been suggested to stop or reduce credit card fraud. However, an effective technique which operates within the physical parameters of conventional credit cards has proven elusive. One suggested technique was to provide an electromagnetic recording of account information on the card. Another technique was to embody a structure within the plastic of the card which rendered it difficult to alter or reproduce. For example, it has been suggested that thin threads be embedded in the plastic, holographic images be imprinted on the plastic, and the like. In another technique, the carholder was assigned a personal identification number which was compared with a personal identification number stored at the bank or credit card headquarters to verify that the true card owner was undertaking the transaction.

Each of these techniques have had its drawbacks. Electromagnetically coded information has been found to be partially erased or otherwise rendered unreliably readable in a significant percentage of legitimate credit cards. Placing alledgely unalterable structures in the plastic of the card has required counterfeiters and alterers to improve their skills but has stopped neither counterfeiting nor altering. Moreover, such techniques have tended to be expensive. Personal identification numbers have been stolen by dishonest bank employees and remembered by merchants, who also retain the other account information on the sales receipt. Further, merchant verification of every credit card transaction has been considered by many to be too time consuming to be acceptable.

The present invention provides an improved credit card and verification technique which overcores the above-referenced problems and others.

SUMMARY OF THE INVENTION

In accordance with the present invention, there is provided a method and apparatus for intercepting lost, stolen, and fraudulent documents.

In accordance with one aspect of the present invention, a method of electroncially verifying the authenticity of credit cards is provided. Each card is marked with account information and a verification code. To verify the authenticity of a credit card, at least one of the account code and the verification code is operated upon electronically by a preselected verification algorithm to determine whether or not the card is authentic.

In accordance with another aspect of the present invention, a plurality of credit card blanks are manufactured, each blank having one of a plurality of relatively permanent, machine-readable secure codes. A secure code of a selected one of the credit card blanks is machine read. Electronic account information of a customer for whom a credit card is to be prepared is received. At least a portion of the account information and the machine-read secure code are electronically operated upon with an encoding algorithm to generate a verification code. It might be noted that the generated verification code is unique not only to the account number but also to the selected, securely encoded credit card blank. At least a portion of the account information and the verification code are encoded on the selected blank to prepare the credit card.

In accordance with another aspect of the present invention, the method includes electronically entering the account information and the verification code and machine-reading the secure code from a credit card. At least a portion of the account information, the verification code and the secure code are operated upon by the verification algorithm to generate an answer. The answer is compared with at least a portion of the verification code and the account information from the credit card.

In accordance with yet another aspect of the present invention, at least a portion of the account information and other electronic data are operated upon by an authentication algorithm to generate an authentication code. The authentication code is displayed and marked on a transaction receipt.

In accordance with another aspect of the invention, an apparatus for verifying the authenticity of credit cards is provided. An encoding means encodes each of a plurality of cards with account information and a verification code. A verification means operates on at least a portion of the account information and the verification code with a verification algorithm to generate an answer. The answer is compared with a preselected portion of the verification code and account information to ascertain authenticity of the card.

In accordance with a more limited aspect of the present invention, a source of credit card blanks provides blanks each of which has one of a plurality of relatively permanent, machine-readable secure codes. A secure code reading means selectively reads the secure codes of one of the blanks. An encoding algorithm means receives account information data of a customer for whom a credit card is to be prepared and the machine-read secure code and operates thereon with a preselected encoding algorithm to generate a verification code. A card encoding means encodes the blank with at least a portion of the account information and the verification code to produce a credit card. The blank may be encoded by embossing, electromagnetic recording, printing, or the like.

In accordance with another aspect of the present invention, there is provided an electronic verification apparatus which includes means for electronically entering at least a portion of the account information and the verification code. A secure code reader reads the secure code from the credit card. A verification algorithm means electronically operates on at least a portion of the received account information, the verification code, and secure code to generate an answer. The verification apparatus may either electronically compare the generated answer with a portion of the verification code or account information from the credit card or may display the generated answer for human comparison.

In accordance with another more limited aspect of the invention, the verification apparatus includes an authentication code generator. In response to a satisfactory comparison of the answer with the portion of the verification code or account information, an authentication algorithm means operates on at least a portion of the account information and other electronic data to generate an authentication code.

One advantage of the present invention is that it intercepts altered, counterfeit, and fraudulent credit cards.

Another advantage of the present invention is that it inhibits counterfeiting and altering of credit cards and other protected documents.

Another advantage of the present invention is that it inhibits merchant collusion in conjunction with the acceptance of altered or counterfeit credit cards.

Still further advantages will become apparent to those of ordinary skill in the art upon reading and understanding the following detailed description.

BRIEF DESCRIPTION OF THE DRAWINGS

The invention may take form in various steps and arrangements of steps or in various parts and arrangements of parts. The drawings are only for purposes of illustrating preferred embodiments of the invention and are not to be construed as limiting it.

DETAILED DESCRIPTION OF THE PREFERRED EMBODIMENTS

Figure 1A:
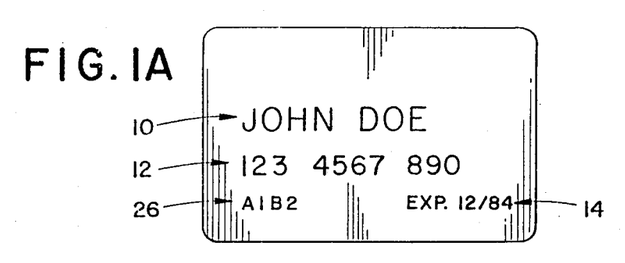
FIG. 1A illustrates an obverse face of a credit card in accordance with the present invention.
Figure 1B:
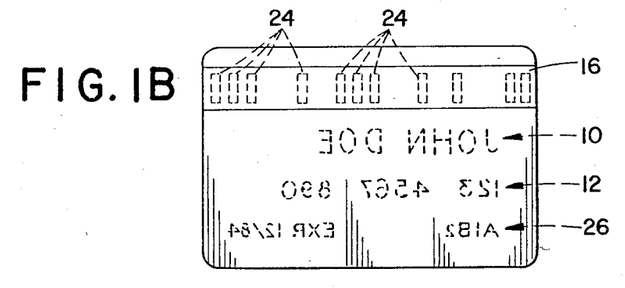
FIG. 1B illustrates a reverse face of the credit card of FIG. 1A.
Figure 1C:
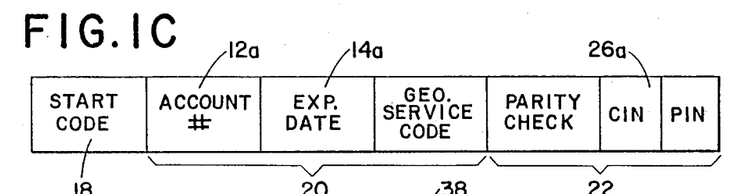
FIG. 1C illustrates an electromagnetic encoding scheme for the credit card of FIGS. 1A and 1B.

With primary reference to FIGS. 1A, 1B, and 1C, a credit card A is encoded with account information including an embossed name 10 of the account owner, an embossed account number 12, and a printed expiration date 14. On an electromagnetic strip 16, the card is electromagnetically coded with a start code 18 to mark the beginning of the electromagnetic encoding, account information data 20, and a verification code 22. The electronic account information preferably includes an account number 12a, an expiration date 14a, and a service code which indicates the country or geographic area in which the account owner resides. The service code is of particular importance in countries which have restrictions on the international transfer of currency. The verification code 22 includes a parity check for checking the parity of the preceeding electromagnetically encoded information to determine whether it has been altered. The verification code further includes a card identification number (CIN) 26a and optionally may include a personal identification number (PIN).

The card A further includes a machine-readable, secure code 24. The secure code is applied to the card or integrally formed therewith in such a manner that the card is physically altered with an alteration of the secure code. In the preferred embodiment, the secure code is digitally encoded with an infrared code. Preferably, the infrared code is masked with an infrared invisible, optically opaque mask, such as electromagnetic recording strip 16. Optionally, other secure coding techniques may be implemented, such as a water mark encoding, a high spectrum infrared encoding, light signatures, and the like. To insure that a verification code is available even if the magnetic strip should become erased or otherwise unreadable, an alpha-numeric, man-readable verification code or card identification number 26 is embossed or printed on the face of the card. In the preferred embodiment, the electromagnetic and the man-readable verification codes are different to inhibit the fraudulent re-recording of the electromagnetic strip based on man-readable information carried on a credit card.

Figure 2:
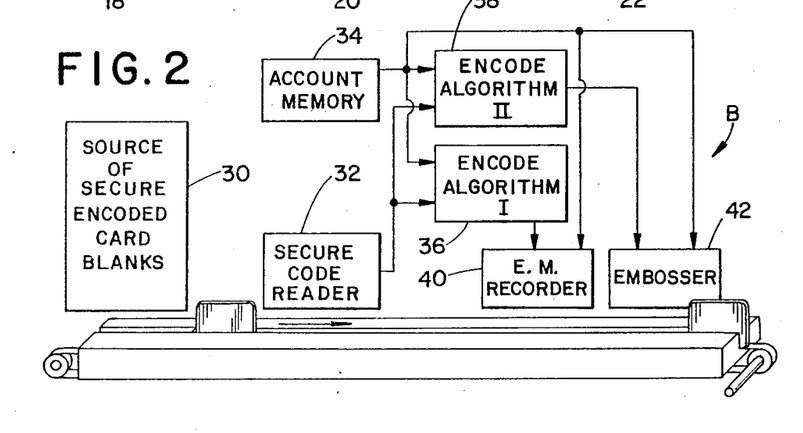
FIG. 2 is a diagramatic illustration of a credit card encoding system in accordance with the present invention.

With particular reference to FIG. 2, each credit card A is uniquely encoded by a card encoding apparatus B with the information set forth above in conjunction with FIGS. 1A, 1B, and 1C. During manufacture, credit card blanks each including a flat, unembossed plastic layer, are printed with the expiration date 14, encoded with the secure code 24 and laminated with the electromagnetic strip 16. Preferably, the secure code is a randomly applied as one of a large plurality of secure codes to inhibit determination of the secure code based on other information which is electromagnetically or man-readably encoded on the card.

Each card blank from a source 30 of card blanks is moved through a secure code reader 32 which reads the secure code carried thereby. An account information latch or memory 34 receives electronic account information for the customer for whom the credit card is being manufactured. Typically, the account information is received from a central computer in which the customer account information is stored. A first or machine-readable encoding algorithm means 36 operates on the account number and the secure code with a first preselected encoding algorithm to derive the machine-readable verification code 22, particularly the card identification number 26a. Various algorithms may be implemented. For example, the secure code may indicate preselected mathematical or semi-mathematical operations. Digits from the account number may be operated on by the indicated mathmatical or semi-mathmatical operations. Mathmatical operations may include multiplying, dividing, squaring, and other mathmatical operations. The semi-mathmatical operations may include transposing digits, utilizing digits for addresses in a look-up table, and other such operations which manipulate and transform one or more digits predictably and reproducably into other digits or groups of digits.

A second or man-readable encoding algorithm means 38 is of analogous construction with the first algorithm means 36. It implements a second encoding algorithm which includes one or more mathmatical or semi-mathmatical operations on the received data to produce the man-readable verification code 26. In the preferred embodiment, the machine-readable and man-readable verification codes are related to the account number and the secure code by different algorithms.

The first algorithm means 36 and the account information memory 34 are connected with an electromagnetic recorder 40 which records the start code 18, the account information 20, and the machine-readable verification code 22 on the electromagnetic strip 16. The second algorithm means 38 and the account information memory 34 are connected with an embossing machine or other machine for providing the man-readable indication of the account information 10, 12, 14 and the verification code 26. In this manner, each credit card is encoded with account information and a verification code which is related to the account information by a secret encoding algorithm.

Figure 3:
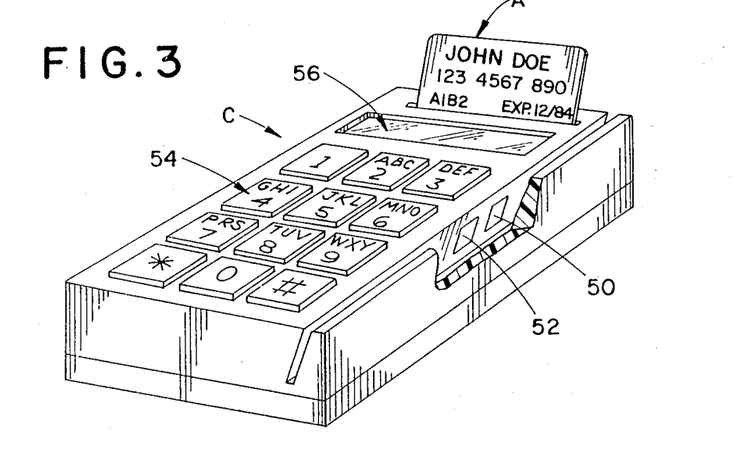
FIG. 3 is a perspective view of a card verification apparatus in accordance with the present invention.
Figure 4:
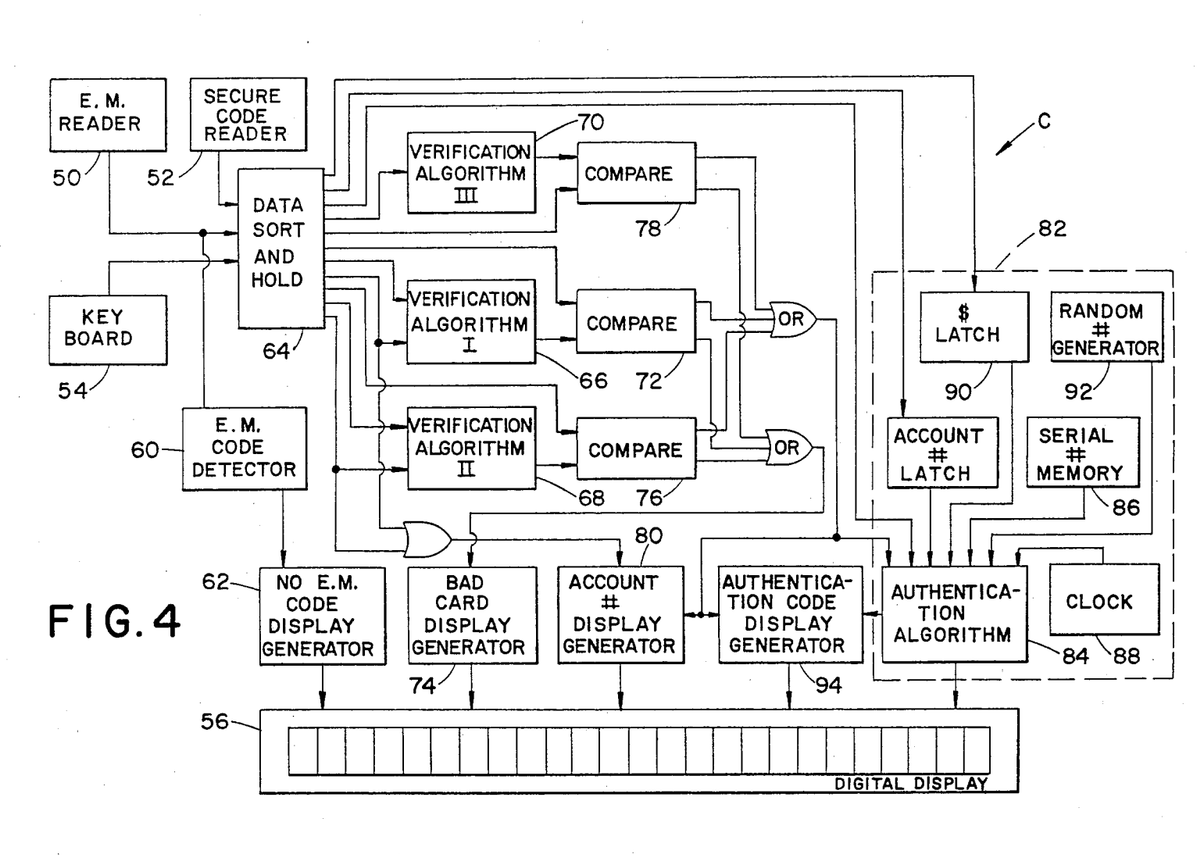
FIG. 4 is a diagramatic illustration of the card verification apparatus of FIG. 3.

With reference to FIGS. 3 and 4, merchants who accept the credit cards are provided with a credit card verification apparatus or box C. The credit card verification apparatus ascertains whether the machine-readable and the man-readable verification codes could have been generated from the secure code and the account information presently encoded on the card. The verification apparatus includes an electronic entry means for entering the account information and verification code from the card. In the preferred embodiment, electronic entry means includes an electromagnetic read head 50, such as found in a tape recorder, for reading the electromagnetically encoded information on this strip 16 and a secure code read head 52, such as an infrared data read head, for reading the infrared encoded secure code 24.

The electronic entry means further includes a keyboard 54 on which a human operator enters the embossed account information and verification code from the credit card. The keyboard provides for the entry of account information and verification code information from cards whose electromagnetic strip is damaged or otherwise unreadable by the electromagnetic read head 50. Optionally, other devices may be implemented for reading the secure code, the account information, and the verification code. For example, mechanical readers may be utilized to read the embossed characters, or the like.

A man-readable display 56 such as a dot matrix, LED, or LCD display is caused by the verification apparatus to display various verification information. For example, account information, such as the account number as read electromagnetically from the card, it displayed for the merchant to compare with the embossed account number on the card. Various codes which indicate that the card has been altered or is otherwise unacceptable are selectively displayed. Further, the man-readable display displays an authentication code which the merchant writes on the sales slip to show that the credit card has, in fact, been passed through the verification apparatus and has passed the appropriate tests. As explained in greater detail herein below, the authentication code is based on account information, a serial number of identification of the specific verification apparatus, and a number which varies from transaction to transaction, e.g. a clock or time signal, a dollar amount of the transaction, a sequence number of the transaction, or the like. The relative unpredictability of the authentication code based on these factors prevents a dishonest merchant from accepting bad credit cards and utilizing account information and authentication codes from a legitimate sale at a subsequent time.

With particular reference to FIG. 4, the electromagnetic read head 50 is operatively connected with an electromagnetic code presence detector 60 which detects whether or not there is readable electromagnetic data on the strip 16. If the strip is blank or unreadable, the electromagnetic code presence detector causes a display generator 62 to generate a display on the display 56 which indicates that no electromagnetic code is present.

A data sorting and temporary storage means 64, such as a plurality of registers or latches, receives and temporarily stores the secure code, the account information, and the verification code information whether entered through the read heads 50, 52 or the keyboard 54. The sorting and temporary storage means may include a plurality of registers which are filled in a preselected order as the card moves past the read head or as the merchant keys in information. Appropriate data separation bits on the tape strip 16 and the entry of non-numeric data separation instructions by the merchant, e.g. with the asterisk (*) key, may index the next register. The data sorting and storing means 64 is connected with three verification algorithm means 66, 68, and 70 which operate on all or part of the entered data with appropriate verification algorithms to determine the authenticity of the card. The verification algorithms may be the same as the encoding algorithms or may be mathematically related to the encoding algorithms in such a manner that the verification algorithms determine that the encoding algorithm could have or could not have generated the verification code from the account and other information encoded on the card.

The first verification algorithm means 66 operates on the machine-read secure code 24 and one of the electromagnetically read account information 20 and the the verification code 22 with a first verification algorithm to generate a first answer code. The first verification algorithm is analogous to the encoding algorithm implemented by the first encoding algorithm means 36 to encode the card. A first comparing means 72 compares the first answer with the other of the verification code 22, particularly the card identification number, and a portion of the account information read electromagnetically from the card and produces an enable signal when they match. When the first comparing means fails to find a match, an appropriate display generator 74 generates an appropriate display indicitive of an unacceptable card. In the preferred embodiment, the first verification algorithm means operates on the secure code and the account information and the first comparing means compares the first answer with the verification code.

The second verification algorithm means 68 implements a second verification algorithm analogous to the encoding algorithm implemented by the second encoding algorithm means 38. The second verification algorithm operates upon the keyboard entered account information and the machine-read secure code 24 to generate a second answer. A second comparing means 74 compares the second answer with the keyboard entered verification code and produces an enable signal when the two match. If there is no match, the second comparing means 76 causes the unacceptable card display generator 74 to generate the appropriate display. Optionally, the second verification algorithm may operate on the verification code or portions of both the verification code and account information and the second answer may be compared with a portion of the account information or portions of the account information and the verification code.

For security, it is preferred that the verification algorithms are not identical to the encoding algorithms. Rather, the verification algorithm may be only a sufficient portion of the corresponding encoding algorithm or sufficiently analogous that the comparing means determines that the secure code and account information could have generated the verification code read from the card. For example, the verification algorithm may work with fewer significant digits than the encoding algorithm or may include a portion of an encoding algorithm look-up table. Different merchant verification apparatus C may include different portions of the encoding algorithm. In this manner, if the verification algorithm of one merchant verification apparatus is decoded or broken, the decoded verification algorithm cannot be used to produce cards that will be accepted by all verification apparatus. Optionally, the verification algorithm and comparing means may operate on the received information in other manners which determine whether or not the verification code, account information, and secure code could have come from a card encoded in accordance with the encoding circuit of FIG. 2 and the first and second encoding algorithms.

The third algorithm means 70 is provided for cards which have no secure code. Many prior art credit cards include an electromagnetically recordable strip but no secure code. These prior art cards can be encoded with an electromagnetic encoding scheme analogous to that shown in FIG. 1C immediately, without replacement with securely encoded card blanks. Although the all electromagnetic encoding scheme provides improved security relative to the prior art, it is not as secure as the secure code preferred embodiment. However, it is advantageous and may be implemented alone or as a transition between the prior art and the preferred embodiment.

During encoding, the first encoding algorithm receives no secure code and generates a corresponding machine-readable verification code 22 or card identification number based only on the account information. The third verification algorithm means 70 operates on the account information or verification code with a third verification algorithm analogous to the first encoding algorithm to generate a third answer. A third comparing means 78 compares to the third answer from the third algorithm means 70 with the verification code 22, or a portion of the account information read from the card. If these two match, an enable signal is generated. If these two do not match, the unacceptable card signal generator 74 generates an appropriate display.

When a credit card passes the verification tests and a enable signal is generated by one of the comparing means, an account number display generator 80 is enabled to display the account number as electromagnetically read from the card or key entered, as may be the case. After the merchant manually compares the account number on display 56 with the embossed account number 12 on the card, the merchant makes an appropriate entry on the keyboard 54 to indicate that the two account numbers match. The match signal from the keyboard and the enable signal from the comparing means enable an authentication code generator 82 to generate an appropriate authentication code.

The authentication code generator includes an authentication code algorithm means 84 which operates on received data with a preselected authentication algorithm to generate an appropriate authentication code, in the preferred embodiment a five digit alpha numeric code. In a preferred embodiment, the authentication code generator 82 receives account information from the data sorting and temporary storage means 64, the serial number of the verification apparatus from an appropriately encoded serial number memory 86, and a time signal from a clock 88. The time signal may be based on the time of day, the number of transactions performed, the date, or the like. The clock signal assures that the authentication code will change from time to time to prevent a dishonest merchant from preparing a fraudulent sales slip charging a second or subsequent sale to an earlier bona fide customer.

Optionally, the authentication algorithm means 84 may be connected with the keyboard by way of a currency value latch 90 for receiving the dollar or currency amount of the sale. Incorporating the currency amount of the sale again insures that the same customer's account when used with the same merchant verification apparatus will normally not generate the same authentication code twice. Optionally, a random number generator 92 may also supply input data to the authentication code algorithm to render it even more unlikely that a customer will twice receive the same authentication code, even on two sequential sales for the same dollar amount. Further, the random number generator 92 renders it more difficult to break the authentication code algorithm by those who would seek to create a fraudulent verification apparatus.

An authentication code display generator 94 causes the display 56 to display the authentication code from the authentication algorithm means 84. The merchant manually writes the authentication code on the credit card receipt. If questions should arise as to the authenticity of a transaction, a like authentication algorithm means located at the offices of the credit card company can be programmed to receive the same input data. The serial number is determinable from company records and the time signal from other contemporaneous credit card receipts, authentication codes of the same merchant verification apparatus, and the like. Even if the random number generator is used, a determination can still be made whether or not the authentication code generator could have generated the authentication code appearing on the receipt. For example, the random number generator may randomly generate one digit numbers, i.e. 0 through 9, which the authentication algorithm adds to the four digit authentication code as the last step. In this manner, there are only 10 four digit authentication codes which could have been generated legitimately.

Figure 5:
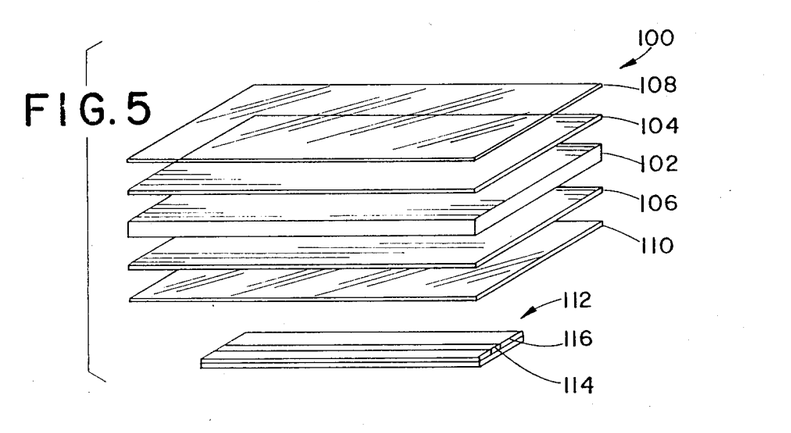
FIG. 5 is an exploded view of an alternate embodiment of a credit card in accordance with the present invention.

FIG. 5 illustrates an alternate embodiment of a credit card construction in accordance with the present invention. The charge or credit card includes a laminated body portion 100 having a core 102, thin printed layers 104, 106 and clear plastic outer layers 108, 110. An electromagnetic recording strip 112 which includes layers of the coercivity magnetic material 114 and high coercivity magnetic material 116 is hot stamped or otherwise laminated to the card body portion. The low coercivity layer includes magnetic dipoles which may be selectively oriented and re-oriented. The high coercivity magnetic layer includes magnetic dipoles which require at least 1200 to 4500 gauss per square centimeter to cause the dipoles to align with the magnetic field. Moreover, although the dipoles are random in the virgin high coercivity material, once aligned, they cannot be returned to their random arrangement, but only can be re-oriented substantially uniformly with an applied high magnetic field. Appropriate high coercivity magnetic materials include a mixture of cobalt ferrite and other similar materials, such as rare earth ferroxides. The secure code may be encoded with the high coercivity magnetic material with zeros being denoted by regions with random polarity and ones being denoted by polarized regions. The high coercivity prevents ones from being later changed to zeros.

Figure 6:
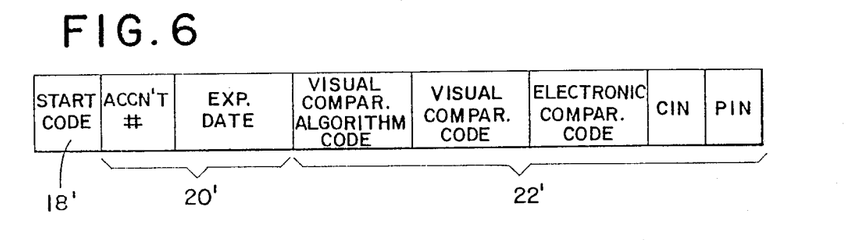
FIG. 6 illustrates an alternate embodiment of a coding scheme for electroncially coding account and verification codes on the credit card; and, FIG. 7 is a circuit diagram of an alternate embodiment of a card verification apparatus.

In the alternate embodiment, the low coercity magnetic strip 116 is electromagnetically encoded with a start code 18' for designating the beginning of the encoding, account information 20', and a verification code 22'. The account information includes an account number corresponding to the embossed account number and an expiration date. The verification code includes a visual comparison algorithm code which designates one of a large plurality of preselected algorithms for generating a visual comparison code or check designation from the account code. An electronic comparison code includes a parity check and other electronic codes that indicate that the data in the electromagnetic strip has not been altered. Specifically, the electronic comparison code includes a number that is a preselected function of preselected number positions in the account number. For example, it may indicate the number of digital ones there preceeding, whether the sum of all preceeding numbers is even or odd, or the like. A card identification number is again related to the account code or other information on the card by a preselected algorithm. A personal identification number corresponds to a personal identification number assigned to the card owner by a preselected algorithm.

Figure 7:
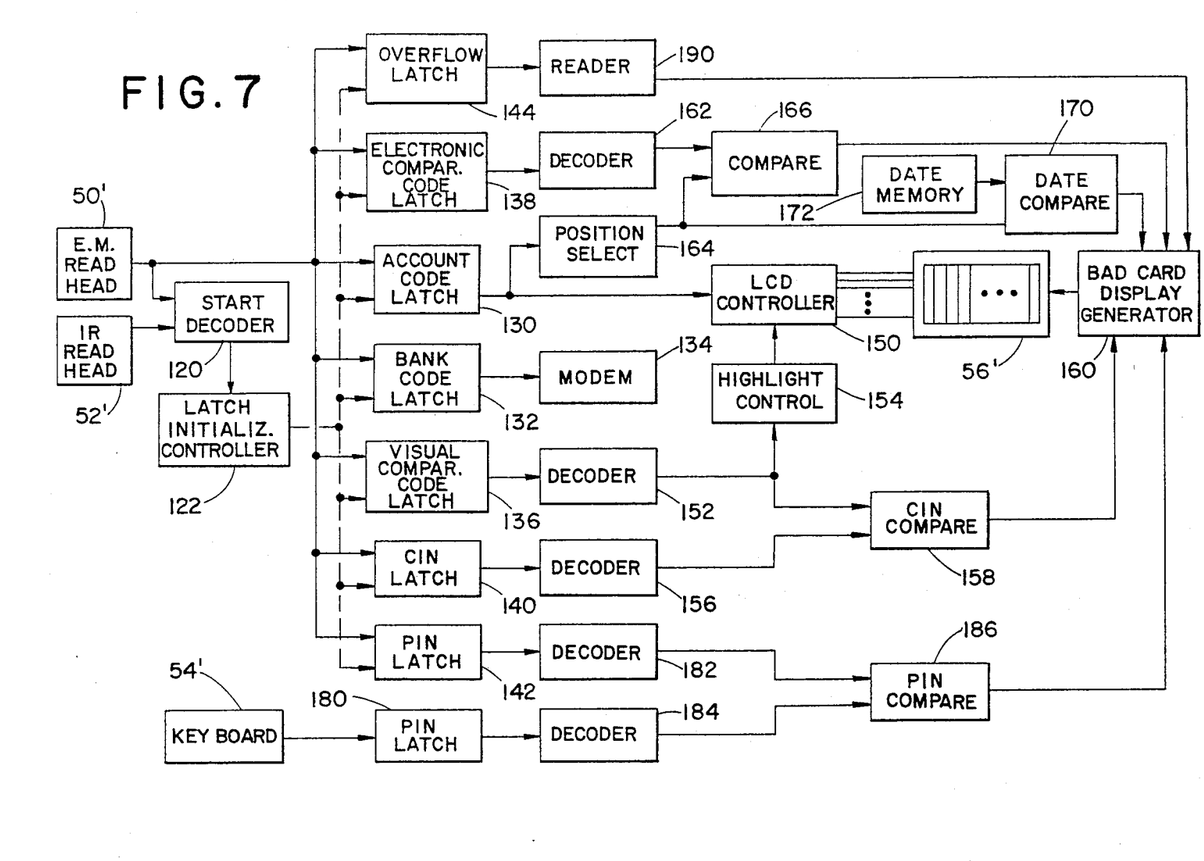

FIG. 7 illustrates an alternate embodiment of a verification circuit in accordance with the present invention. As the recording strip 112 moves past the read heads 50', 52', the electromagnetically encoded information and the secure coded information are read. The start code 18' is received by a decoder 120 and a latch initialization controller 122 to identify the first bit of the account and verification codes.

An account code latch 130 stores the account information and a bank code latch 132 stores that portion of the account code which identifies the issuing bank. When connected on-line to a bank computer, a modem 134 transmits the bank code to the bank computer as part of the transaction transmission. A visual comparison code latch 136 temporarily stores the visual comparison code which is encrypted on the electromagnetic strip to provide an indication of which portions of the account number are to be highlighted on the display 56. An electronic comparison code latch 138 stores the electronic code, a card identification number latch 140 stores the card identification number, and a personal identification number latch 142 stores the personal identification number (PIN). An overflow latch 144 determines if extra characters appear beyond the end of the properly encoded region.

The account code latch 130 is connected with a display controller 150 for controlling the output, particularly the account number, on the man-readable display 56'. The visual comparison code latch 136 is connected with a decoder 152 which implements an algorithm for converting the visual comparison code into a designation of the selected positions or digits of the display 56' to be highlighted. A highlight controller 154 causes the designated positions of the display to be highlighted, e.g. displayed with greater intensity, displayed in a different color, or the like.

The card identification number latch 140 is connected with a card identification number decoder 156 which implements a card identification number algorithm to covert the card identification number into the visual comparison code. A comparing means 158 compares the visual comparison code from the card as decoded by decoder 152 with the visual comparison code as generated from the card identification number by the decoder 156. If the two fail to match, the comparing means 158 causes a bad card display generator 160 to generate a display indicitive of a bad card.

The electronic comparison code latch 138 is connected with a decoder 162 for implementing an electronic comparison code algorithm for converting the electronic comparison code into the alphanumeric symbols which appear at the selected corresponding positions in the account information. A position selecting means 164 selects the alphanumeric symbols from the corresponding positions of the account information. A comparing means 166 compares the selected digits from the position selecting means and the decoder 162. If there is no match, the unacceptable card display generator 160 is again enabled.

A date comparing means 170 compares the date read from the card with a preselected date from a date memory 172 to verify that the expiration date read from the card is an appropriate date range. If the expiration date is not in the appropriate range, the unacceptable card display generator is again enabled.

A keyboard 54' is connected with a personal identification number latch 180 to receive a customer keyed personal identification number. Decoders 182 and 184 operate on the personal identification code as read from the card and the personal identification number as entered by the customer and a comparing means 186 compares the two decoded personal identification numbers. If there is no match, the unacceptable card display generator 160 is again enabled.

An overflow latch reader 190 determines whether any bits of data are stored in the overflow latch 144. If extra characters beyond the proper code are read from the latch, the reader 190 again causes the unacceptable card display generator 160 to generate a corresponding bad card display.

Upon presentation of a card, the merchant slides the card through the slot of the reader so that the high and low coercivity electromagnetically encoded information is read as well as the infra-red encoded information. Preferably, an erase head is placed in line with the high coercivity magnetic track to erase any low level magnetic recordings thereon. A man-readable display is generated of the account number or other account information with a subset of the account numbers as determined from the visual comparison code highlighted. The merchant compares the man-readable account information from the card with the man-readable display 56'. To show that the merchant has made the comparison, the merchant marks the highlighted symbols of the alphanumeric display on the paper credit card receipt.

If the merchant fails to mark the appropriate highlighted numbers, this provides an indication that the merchant did not make the comparison and may be held responsible if the card has been altered or is a counterfeit.

In yet another alternate embodiment, the high magnetic coercivity layer is embedded within the card and may be limited in shape, such as silk screening, to the logo of the company, an image, or the like. Upon polarizing the high coercivity material, the material is thereafter detectable, even if the polarity with which it is recorded is changed. As another example, the high coercivity magnetic material may be placed under the embossed letters and may be magnetically polarized along the embossed letters. If an embossed letter is lowered by a forger and a new letter raised, the original letter is still readable from the polarized high coercivity magnetic material thereunder.

The invention has been descripted with reference to the preferred embodiments. Obviously, modifications and alterations will occur to others upon reading and understanding the preceeding detailed description. It is intended that the invention be construed as including all such alterations and modifications in so far as they come within the scope of the appended claims or the equivalents thereof.

Having thus described preferred embodiments, the invention is now claimed to be:

1. A method of securing credit card transactions against tampering and counterfeiting, the method comprising:
    encoding card blanks with at least account information and a verification code generated with an encoding algorithm to produce credit cards;
    verifying authenticity of one of the credit cards by electronically operating on at least a portion of one of the verification code and the account information with a verification algorithm to generate an answer for comparison with at least a portion of the account information and the verification code, the verification algorithm being different from the encoding algorithm such that the authenticity verification is less than completely accurate to protect the encoding algorithm from being reverse engineered from the verification algorithm.

2. The method as set forth in claim 1 further including before the encoding step, the steps of:
    preparing the card blanks, each card blank having one of a plurality of relatively permanent, machine-readable secure codes;
    machine-reading the secure code of a selected one of the card blanks;
    receiving the account information of a customer for whom a credit card is to be prepared;
    operating on at least a portion of the account information and the machine-read secure code with the encoding algorithm to generate the verification code, whereby the verification code is unique to the selected card blank and the account information.

3. The method as set forth in claim 1 wherein the authenticity verification step includes:
    electronically entering from the credit card a relatively permanent secure code and at least a portion of one of the verification code and the account information;
    the step of electronically operating on at least the portion of one of the verification code and the account information with the verification algorithm further includes operating on the secure code to generate the answer; and,
    comparing the answer with at least a portion of the account information and the verification code.

4. The method as set forth in claim 3 further including after the authenticity verification step, the steps of:
    generating an authentication code by electronically operating on at least a portion of the account information and other electronic data with an authentication algorithm to generate an authentication code;
    displaying the authentication code; and,
    placing the authentication code on a receipt.

5. A method of securing card transactions against tampering and counterfeiting, the method comprising:
    (a) preparing card blanks, each card blank having one of a plurality of relatively permanent, machine-readable secure codes, the secure code being alterable only by physical alteration of the card blank;
    (b) machine-reading the secure code of a selected one of the card blanks;
    (c) receiving account information of a customer for when a card is to be prepared;
    (d) operating on at least a portion of the account information and the machine-read secure code with first and second encoding algorithms to generate first and second verification codes, the second verification code is in humanly-readable form, whereby the verification codes are unique to the selected card blank and the account information;
    (e) encoding at least a portion of the account information and the verification codes on the selected card blank to prepare a card;
    (f) electronically entering, such as by key entering or electronically reading, at least a portion of the account information and a verification code from the card;
    (g) machine-reading at least a portion of the secure code from the card;
    (h) electronically operating on at least a portion of the entered account information, the entered verification code, and the machine-read secure code with a verification algorithm to generate an answer;
    (i) comparing the answer with at least a portion of one of the entered verification code and the entered account information for coincidence;
    (j) subsequent to determining coincidence in the comparing step, operating on at least a portion of the entered account information and other electronic data with an authentication algorithm to generate an authentication code, the other electronic data including data indictive of at least one of an identification code for an electronic verification apparatus, a time code indicitive of when the credit card was verified, a currency amount of the sale, a random number, and the verification code from the card; and,
    (k) placing the authentication code on a sales receipt.

6. An apparatus for securing credit card transactions against tampering and counterfeiting, the apparatus comprising:
    means for encoding card blanks with primary encrypted data representative of at least account information;
    means for encoding the card blanks with secondary encrypted data representative of at least the account information, the secondary encrypted data being in humanly-readable form;

verifying means for electronically operating on at least a portion of one of the primary encrypted data and the secondary encrypted data with a preselected verification algorithm to generate an answer for comparison with at least a portion of the account information and the secondary encrypted data to verify the authenticity of one of the cards.

7. The apparatus as set forth in claim 6 further including:

a source of card blanks, each card blank having one of a plurality of relatively permanent, machine-readable secure codes;

secure code reading means for reading the secure code of a selected one of the card blanks;

an encoding algorithm means for operating on at least a portion of the account information and the machine-read secure code with an encoding algorithm to generate the secondary encrypted data, the algorithm means being operatively connected with the card encoding means.

8. The apparatus as set forth in claim 6 wherein the verifying means includes:

electronic entry means for electronically entering from the card the secure code and at least a portion of the secondary encrypted data and the account information;

a verification algorithm means for electronically operating on the secure code and at least a portion of the electronically entered secondary encrypted data and account information with the verification algorithm to generate the answer; and, comparing means for comparing the answer with at least a portion of the account information and the secondary encrypted data.

9. The apparatus as set forth in claim 6 further including:

an authentication code generating means for electronically operating on at least a portion of the account information and other electronic data with an authentication algorithm to generate an authentication code; and, a man-readable display for displaying the authentication code.

10. An apparatus for securing card transactions against tampering and counterfeiting, the apparatus comprising:

(a) a source of card blanks, each card blank having one of a plurality of relatively permanent, machine-readable secure codes;

(b) secure code reading means for reading the secure code of a selected one of the card blanks;

(c) first encoding algorithm means for operating on at least a portion of received account information and the machine-readable secure code with a first encoding algorithm to generate a first verification code, the first encoding algorithm means being operatively connected with the secure code reading means;

(d) a second encoding algorithm means for operating on at least a portion of the account information and the secure code with a second encoding algorithm to generate a second verification code;

(e) electromagnetic encoding means for encoding at least a portion of the account information and the first verification code electromagnetically on the selected card blank, the electromagnetic encoding means being operatively connected with the first encoding algorithm means;

(f) embossing means for embossing at least a portion of the account information and the second verification code on the selected card blank in a humanly-readable format, the embossing means being operatively connected with the second encoding algorithm means;

(g) an electromagnetic read head for reading the electromagnetically encoded account information and verification code from the card;

(h) a keyboard for electronically entering at least a portion of the embossed account information and verification code from the card;

(i) a secure code reader for machine-reading the secure code from the card;

(j) a first verification algorithm means for electronically operating on at least a portion of the electromagnetically read account information and verification code and the machine-read source code with a first verification algorithm to generate a first answer, the first verification algorithm means being operatively connected with the electromagnetic read head;

(k) a first comparing means for comparing the first answer with at least a portion of one of the electromagnetically read account information and verification code for coincidence, the first comparing means being operatively connected with the electromagnetic read head and the first verification algorithm means;

(l) a second verification algorithm means for operating on at least a portion of the key entered account information and verification code and the machine-read secure code with a second verification algorithm to generate a second answer, the second verification algorithm means being operatively connected with the keyboard;

(m) a second comparing means for comparing the second answer with at least a portion of the key entered account information and verification code for coincidence, the second comparing means being operatively connected with the second verification algorithm means; and, (n) an authentication code generating means for operating on at least a portion of the account information and other electronic data with an authentication algorithm to generate an authentication code, the authentication code generating means being operatively connected with the first and second comparing means to be selectively enabled thereby.

11. The method as set forth in claim 1 wherein the authenticity verification step is performed with at least one of a plurality of verification algorithms, each verification algorithm being effective to identify a different subset of tampered and counterfeited cards.

12. The apparatus as set forth in claim 6 further including a random event generator means for generating a value which is unpredictable from data encoded on the card and wherein the verifying means is operatively connected to the random event generator means for receiving the unpredictable value and operating on the unpredictable value to generate the answer.

* * * * *